(12) United States Patent
Hahn et al.

(10) Patent No.: US 10,133,741 B2
(45) Date of Patent: Nov. 20, 2018

(54) LOG DATA SERVICE IN A VIRTUAL ENVIRONMENT

(71) Applicant: Amazon Technologies, Inc., Reno, NV (US)

(72) Inventors: Henry David Hahn, Redmond, WA (US); Daniel Vassallo, Seattle, WA (US); Xiaosong Pan, Kenmore, WA (US); Emmanuel Pierre Devillard, Issaquah, WA (US); Hongqi Wang, Newcastle, WA (US); Muhammad Umer Azad, Redmond, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 14/180,217

(22) Filed: Feb. 13, 2014

(65) Prior Publication Data

US 2015/0227598 A1 Aug. 13, 2015

(51) Int. Cl.
*G06F 17/30* (2006.01)
*G06F 11/34* (2006.01)
*G06F 11/30* (2006.01)

(52) U.S. Cl.
CPC .... *G06F 17/3007* (2013.01); *G06F 17/30082* (2013.01); *G06F 11/3006* (2013.01); *G06F 11/3476* (2013.01); *G06F 17/30424* (2013.01); *G06F 17/30867* (2013.01)

(58) Field of Classification Search
CPC ............ G06F 11/3476; G06F 11/3006; G06F 17/30082; G06F 17/30424; G06F 11/3452; G06F 17/30073; G06F 17/30867
USPC .......................... 707/722, 758, 648, 737, 672
See application file for complete search history.

(56) References Cited

U.S. PATENT DOCUMENTS

| 8,478,800 B1* | 7/2013 | Johnson ................. H04L 67/42 707/827 |
| 8,661,068 B1 | 2/2014 | Seibel et al. |
| 8,732,300 B2* | 5/2014 | Barsness ........... G06F 17/30516 709/223 |
| 8,769,701 B2* | 7/2014 | Hinton .................... G06F 21/41 726/26 |

(Continued)

FOREIGN PATENT DOCUMENTS

WO WO 2013165369 A1 * 11/2013 ......... G06F 9/45558

OTHER PUBLICATIONS

"FactFinder Enterprise," BlueStripe Software, http://bluestripe.com/products/factfinder/, retrieved Jan. 28, 2015, 3 pages.

(Continued)

*Primary Examiner* — Dangelino N Gortayo
(74) *Attorney, Agent, or Firm* — Klarquist Sparkman, LLP (57) ABSTRACT

A log data service in a virtual environment that allows customers of a compute service provider to access system, application and custom log files associated with virtual machine instances that are executing. In some embodiments, log data can be received that includes events or messages from virtual machines in a multi-tenant environment. The log data can be transformed into metric data, which can be used by the customer to generate statistics, view graphs, and generally monitor the customer's virtual machine instances. The log data can also be stored as a service so that the customer has a central repository for which to access the log data.

21 Claims, 9 Drawing Sheets

(56) References Cited

U.S. PATENT DOCUMENTS

| | | | |
|---|---|---|---|
| 8,806,005 B2* | 8/2014 | Miri | H04L 41/069 709/200 |
| 8,918,411 B1* | 12/2014 | Latif | G06F 17/30029 707/687 |
| 8,977,741 B1* | 3/2015 | Fredinburg | G06F 9/5061 707/745 |
| 9,122,841 B2 | 9/2015 | Pavlov et al. | |
| 9,203,866 B2* | 12/2015 | Chatterjee | H04L 41/5041 |
| 9,384,112 B2 | 7/2016 | Petersen et al. | |
| 9,460,169 B2* | 10/2016 | Hinton | G06F 17/30557 |
| 9,542,400 B2* | 1/2017 | Doering | G06F 17/30073 |
| 9,626,240 B2 | 4/2017 | Rajkovic et al. | |
| 2003/0079043 A1 | 4/2003 | Chang et al. | |
| 2005/0198238 A1 | 9/2005 | Sim et al. | |
| 2008/0250265 A1 | 10/2008 | Chang et al. | |
| 2009/0292954 A1 | 11/2009 | Jiang et al. | |
| 2010/0161574 A1 | 6/2010 | Davidson et al. | |
| 2010/0174939 A1 | 7/2010 | Vexler | |
| 2011/0119100 A1 | 5/2011 | Ruhl et al. | |
| 2011/0119374 A1 | 5/2011 | Ruhl et al. | |
| 2011/0282908 A1 | 11/2011 | Fly et al. | |
| 2011/0314148 A1* | 12/2011 | Petersen | G06F 11/3476 709/224 |
| 2012/0089726 A1 | 4/2012 | Doddavula | |
| 2012/0124294 A1 | 5/2012 | Atkisson et al. | |
| 2012/0166869 A1* | 6/2012 | Young | G06F 11/008 714/15 |
| 2012/0311475 A1 | 12/2012 | Wong | |
| 2013/0007183 A1 | 1/2013 | Sorenson et al. | |
| 2013/0007265 A1* | 1/2013 | Benedetti | H04L 67/1097 709/224 |
| 2013/0014107 A1 | 1/2013 | Kirchhofer | |
| 2013/0024567 A1* | 1/2013 | Roxburgh | G06F 11/3006 709/224 |
| 2013/0066869 A1 | 3/2013 | Kusaka et al. | |
| 2013/0080642 A1 | 3/2013 | Adam et al. | |
| 2013/0173536 A1 | 7/2013 | Gokhale | |
| 2013/0238572 A1 | 9/2013 | Prahlad et al. | |
| 2013/0263209 A1 | 10/2013 | Panuganty | |
| 2014/0164700 A1 | 6/2014 | Liang | |
| 2014/0196013 A1 | 7/2014 | Orr et al. | |
| 2014/0201737 A1 | 7/2014 | Mitkar et al. | |
| 2014/0208001 A1 | 7/2014 | Liu et al. | |
| 2014/0215574 A1 | 7/2014 | Erb et al. | |
| 2014/0281131 A1 | 9/2014 | Joshi et al. | |
| 2014/0344622 A1* | 11/2014 | Huang | G06F 11/0775 714/37 |
| 2015/0039712 A1 | 2/2015 | Frank et al. | |
| 2015/0081880 A1 | 3/2015 | Eaton et al. | |
| 2015/0081883 A1 | 3/2015 | Katz et al. | |
| 2015/0081885 A1 | 3/2015 | Thomas et al. | |
| 2015/0082432 A1 | 3/2015 | Eaton et al. | |
| 2015/0095289 A1 | 4/2015 | Prabhu et al. | |
| 2015/0229546 A1* | 8/2015 | Somaiya | H04L 43/045 715/736 |
| 2015/0295766 A1 | 10/2015 | Dickey | |

OTHER PUBLICATIONS

Logstash—Introduction, Jun. 25, 2014, 9 pages, downloaded from http://web.archive.org/web/20140625164919/http://logstash.net/docs/1.4.2/tutorials/getting. . . .

Logstash—open source log management, Jul. 21, 2014, 3 pages, downloaded from http://web.archive.org/web/20140721075828/http://logstash.net/docs/1.4.2.

Logstash—Pull metrics from logs, Jul. 2, 2014, 3 pages, downloaded from http://web.archive.org/web/20140702215035/http://logstash.net/docs/1.4.2/tutorials/metric . . . .

Logstash—ship logs from any source, parse them, get the right timestamp, index them, and search them, Dec. 8, 2014, 2 pages, downloaded from http://web.archive.org/web/20141208211709/http://logstash.net/.

Logstash, What is, Jul. 15, 2014, 1 page, downloaded from http://web.archive.org/web/20140715101926/http://logstash.net/docs/1.4.2/learn.

International Search Report and Written Opinion for PCT/US2015/015808, dated Jun. 10, 2015, 8 pages.

Preliminary Report on Patentability for PCT/US2015/015808, dated Jun. 10, 2015, 8 pages.

* cited by examiner

LOG DATA SERVICE IN A VIRTUAL ENVIRONMENT

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Some cloud environments provide monitoring services that monitor the computing resources and applications being run by customers. The customer can also supply custom metrics to such monitoring services, the custom metrics being generated by the customer's own applications. The monitoring services can use the received custom metric data to allow a customer to gain system-wide visibility into resource utilization, application performance and operational health.

In order to obtain the custom metrics, each customer independently develops software to extract the custom metrics generated by the customer's applications. Such a need to independently developed software has led to few customers supplying custom metrics to the monitoring services.

DETAILED DESCRIPTION

A log data service is described for a multi-tenant environment that allows customers to access system, application and custom log files associated with virtual machine instances that are executing. In some embodiments, log data can be received that includes events or messages from virtual machines in the multi-tenant environment. The log data can be transformed into metric data, which can be used to generate statistics, graphs, and generally monitor the customer's virtual machine instances. The log data can also be stored as a service so that the customer has a central repository for which to access the log data.

Figure 1:
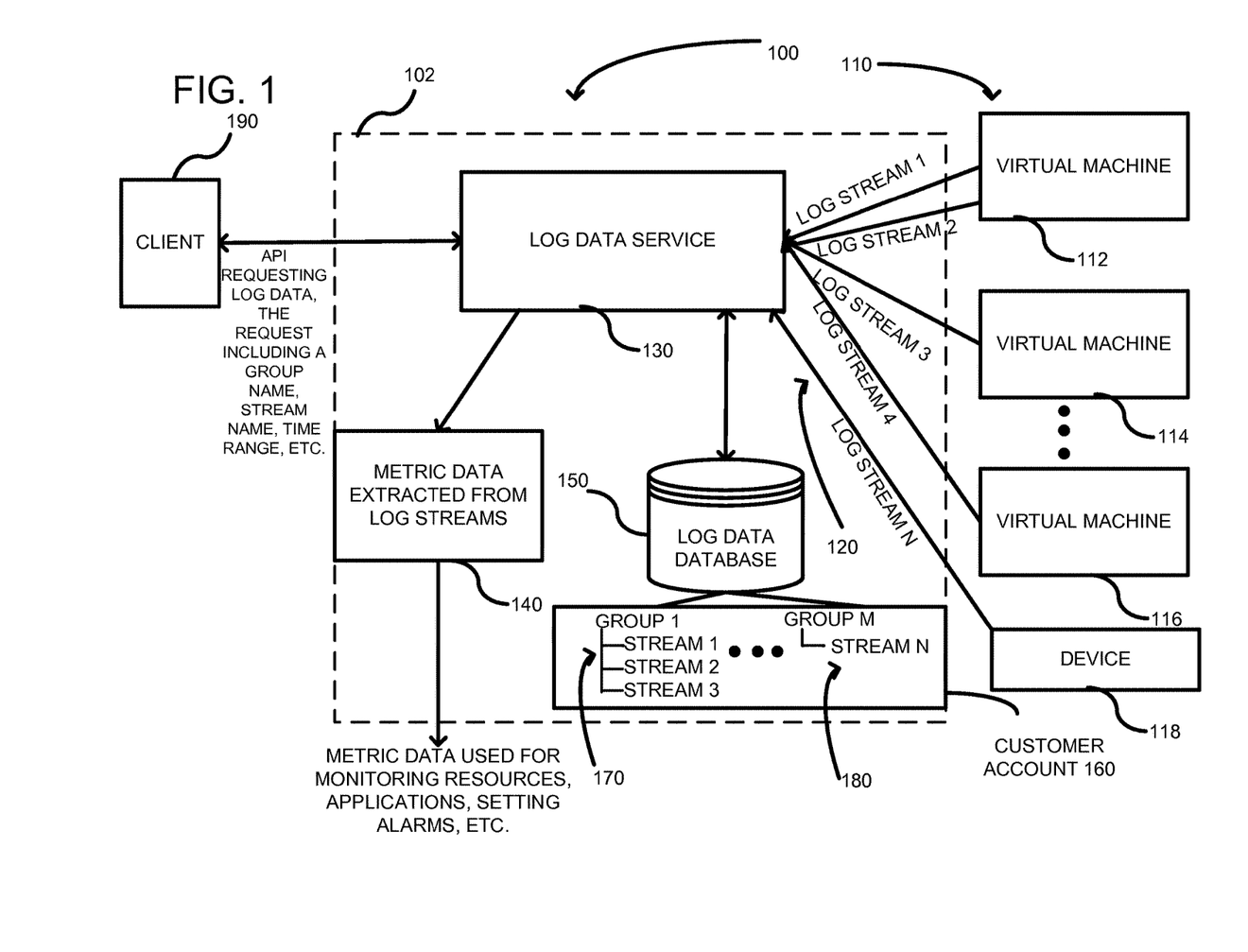
FIG. 1 is an overall system diagram illustrating a log data service that collects a plurality of log streams and groups the log streams for access by a customer.

FIG. 1 is an overall system diagram illustrating a system 100 including a log data system 102 that collects a plurality of log streams and groups the log streams for access by a customer. The system 100 includes a plurality of virtual machines 110 (any integer number of virtual machines can be used) that can be running in a multi-tenant environment on a plurality of host server computers. The virtual machines are associated with a single customer in this example, but the log data service is typically used by a plurality of customers simultaneously. Generally, the virtual machines include an operating system and one or more applications. Each virtual machine can generate one or more log streams associated with recording events taking place while executing. The log streams can be a continuous stream of data or a log file that is transmitted in predetermined data chunks. The log streams can be useful in order to provide an audit trail used to track the activity of the system and to diagnose problems. Each log stream can be a registered named source of log events associated with a customer and each log stream can be uniquely named. The log streams generally include individual entries that have information about an event or message from an application. The event entry in the log can include such things as a timestamp, an IP address of a requestor and/or the recipient, a resource being requested, a user agent, etc. The log stream can be used to maintain a logical grouping of log events, while separating it from other streams.

As indicated, a virtual machine 112 includes multiple streams that are being concurrently transmitted. Any number of concurrent streams can be transmitted from a virtual machine and each stream is generally associated with a source (e.g., an instance identifier, a host name, an application name, a file path, etc.) or with a type of data (system event logs, error logs, transaction logs, etc.). Virtual machines 114, 116 are shown transmitting a single stream, but, like virtual machine 112, can be transmitting any number of streams. The streams can be described by the customer with metadata (called tags) to make it easier to access and manage the stream of events. A customer can have many log streams on an individual host server computer and/or many log streams across a plurality of host server computers, which are executing the virtual machines. The log streams can also be generated by other devices, as shown at 118, such as hardware or software devices within a compute service provider or external to the compute service provider.

The streams, shown generally at 120, are received by a log data service 130. As described further below, the log data service can be a service offered by a compute service provider to which customers can subscribe with payment of a fee. As further described below, the log data service 130 can search through the log data received in the log streams 120 and transform the log data into metrics. For example, the log data service can search for the log data using predetermined patterns and for any match of a pattern, a metric can be generated. The predetermined patterns can be retrieved from storage. In a simple example, a pattern can be an "error" message. The log data service 130 can search the log streams for an error message and each time an error message is encountered, an error-message counter can be incremented. In another example, an HTTP 404 error message can be searched on, which indicates that the server could not find what was requested. Such a metric can be monitored and if it exceeds a predetermined threshold, a notification to the customer can be transmitted. As indicated at 140, the log service 130 can transmit the metric data so that it can be used by one or more other services, which perform functions such as allowing a customer to monitor resources, applications, setting alarms, etc.

The log service 130 can also store the log streams 120 in one or more log data databases 150. Generally, the streams are associated with a customer account (which was received or derived from the receipt of the log stream), as indicated at 160. The streams can be associated with a group. A group indicates a type of stream and such groups can be customizable by the customer. For example, multiple streams can be received from different servers all hosting a same website. In such an example, the streams are highly related and linked in that they all relate to website activity, which can be a type. Thus, all of the streams can be associated with a common group. As indicated at 170, Group 1 includes three streams that span two different virtual machines 112 and 114. Group M at 180 only has a single stream from a single virtual machine 116. Thus, each group can be associated with any number of streams sourced from any number of virtual machines, which can span multiple host server computers.

A client 190 is shown that is associated with the customer that launched the virtual machines 110. The client 190 can transmit an API request including a group name, a stream name, a time range (e.g., start and end times), etc. in order to obtain the log data stored in the data base 150. Although shown as an API request, any web service request can be used. A web service is a software function provided at a network address over the web or the cloud. Clients initiate web service requests to servers and servers process the requests and return appropriate responses. The client web service requests are typically initiated using, for example, an API request. The API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. In this case, the API request from the client 190 is received by the log data service 130, which acts as a centralized repository of log data for virtual machines of the customer. Once the request is received, the log data service 130 can retrieve the appropriate log data from the database 150. For example, the API request generally includes a customer account number associated with the customer account 160. This information can be used as a key to access appropriate data in database 150. The group name and stream name can further be used to extract the precise data desired, as is well understood in the art. The data retrieved from the database 150 can be transmitted back to the client device in the form of an API response. The parameters shown in conjunction with the API request are merely a detailed example and can be modified by adding or eliminating any of the parameters. Thus, using the log data service, a client 190 can have a central repository in the system 100 for accessing log data generated from multiple virtual machines, and such virtual machines can span multiple server computers. The log data from the multiple streams can be grouped according to type, which is a common feature (e.g., hits on a website, error messages in an application, etc.) associated with the log data, wherein the types can be defined by the customer.

Figure 2:
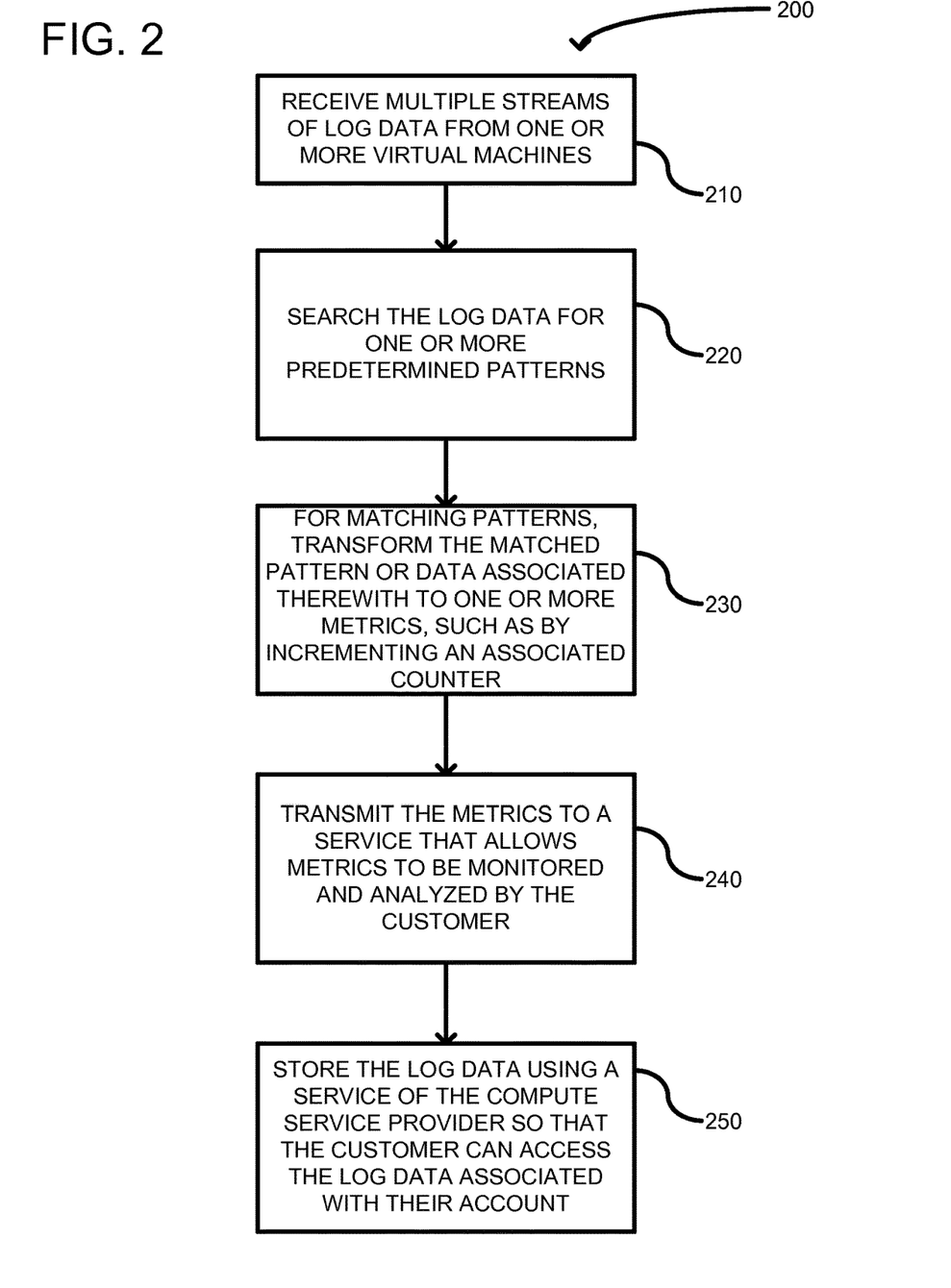
FIG. 2 is a detailed flow diagram according to one embodiment for storing and analyzing log data using a log data service.

FIG. 2 is a flowchart 200 of a method according to one embodiment. In process block 210, multiple streams of log data can be received from one or more virtual machines in a log data service. The multiple streams can be associated with a customer of the multi-tenant environment. The multiple streams can be from different sources, such as different host server computers. Multiple streams can also come from the same virtual machine on a single host. In any event, each stream can be received from the virtual machine in the form of an API call. The API call can include customer account information, a group name with which the log data is associated, the source of the stream (e.g., instance identifier, host name, application identifier, file path, etc.), and the event data (i.e., log data) itself. Other fields can be added. Alternatively, some of the fields can be removed. The particular form of how to receive the data depends on the particular design of the system and a variety of formats can be used. In process block 220, the log data service that received each stream can search through the log data associated with the stream for one or more predetermined patterns. Alternatively, the log data service can search based on any of the API parameters, such as the group parameter, the source parameter, the customer account, etc. and use such API parameters to transform the log data to metric data. Thus, the predetermined patterns being searched can be API-based tag information or the data between the tags. In process block 230, the patterns that are matched or the data associated therewith can be transformed to a metric. In a simple example, every time an error code is encountered, a counter associated with error codes can be incremented. Other examples could be that every time the source has a particular instance identifier, a metric is incremented. In still other examples, the matched pattern can be converted into multiple metrics. For example, once a pattern is matched, multiple fields can be extracted from the log file. Whatever particular implementation is used, the matched pattern can be associated with one or more metrics and the metrics can be generated or modified based on the matched pattern. In process block 240, the metrics can be transmitted to another service that allows metrics to be monitored and/or analyzed by the customer. The customer can set up alarms associated with the metrics, generate statistics and graphs using the metrics, or otherwise monitor the metrics to ensure that the applications that generate the log streams are behaving within desired limits. In process block 250, the log data can be stored using a compute service provider. For example, the compute service provider can store the log data in association with a customer account so that the customer has a centralized repository to access log data. The log data can be further sub-divided based on group name, stream identifier, etc.

Figure 3:
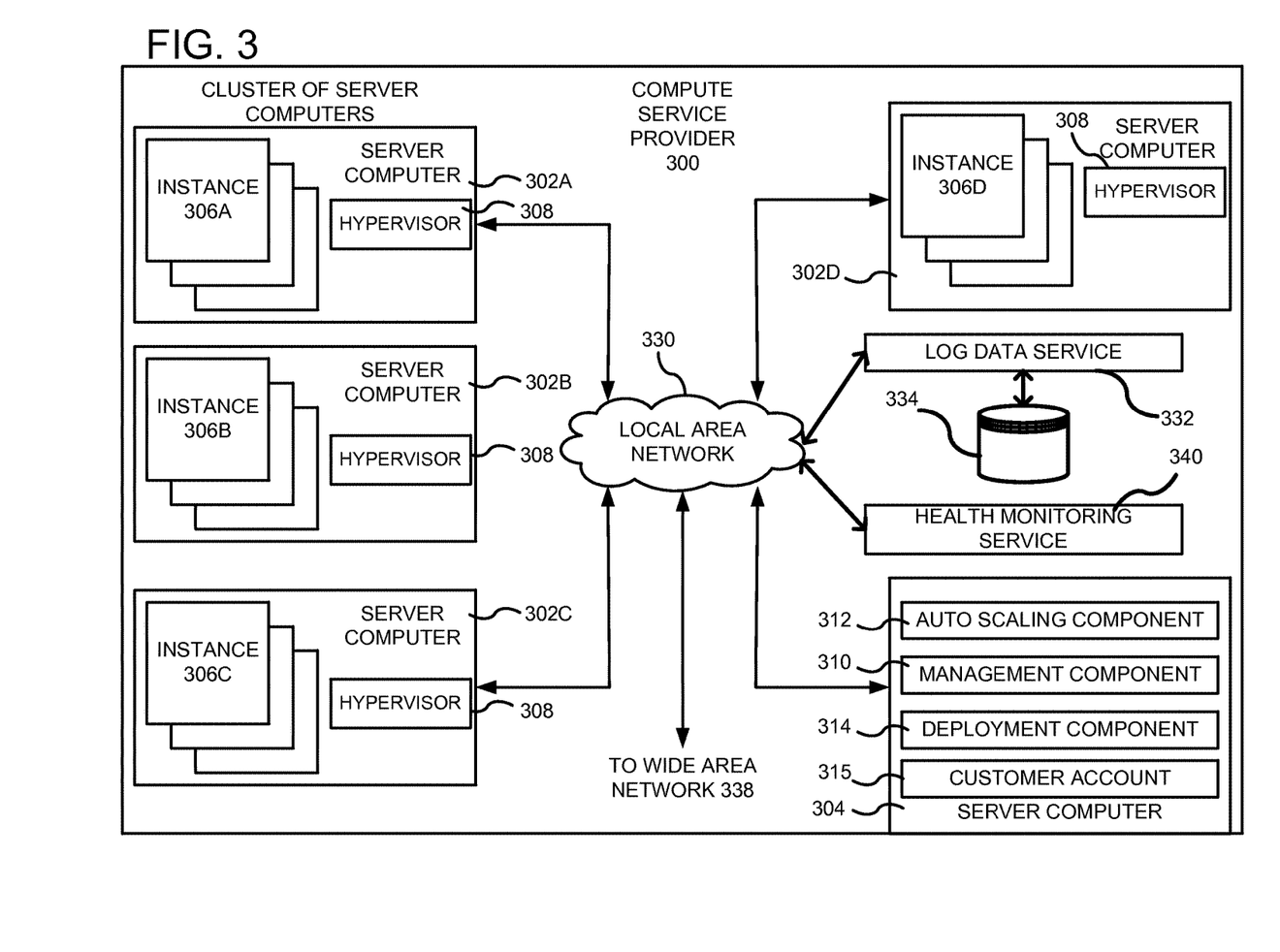
FIG. 3 is an example system diagram showing a plurality of virtual machine instances running in the multi-tenant environment with a log data service in communication with the virtual machine instances.

FIG. 3 is a computing system diagram of a network-based compute service provider 300 that illustrates one environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the servers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 330 can be utilized to interconnect the server computers 302A-302D and the server computer 304. The network 330 can be a local area network (LAN) and can be connected to a Wide Area Network (WAN) 338 so that end users can access the compute service provider 300. It should be appreciated that the network topology illustrated in FIG. 3 has been simplified and that many more networks and networking devices can be utilized to interconnect the various computing systems disclosed herein.

The compute service provider 300 can provide one or more services, such as a log data service 332 and a health monitoring service 340. The log data service 332 can receive log streams from the instances 306 and convert the log streams to metric data. The metric data can then be transmitted to the health monitoring service 340. The customer can make requests to the health monitoring service 340 to view the metrics, set thresholds, generate graphs and statistics associated with the metrics, etc. Although shown separately, the health monitoring service 340 and log data service 332 can be combined into a single service. Alternatively, the services 332, 340 can be further sub-divided. The metrics generated by the log data service 332 can be transmitted to the health monitoring service 340 through the local area network 330. The log data received can be stored by the log data service 332 in a log database 334. The log database 334 can store the log data in association with a customer account identifier so that the customer can easily retrieve the original log data. For example, if a customer wants further analysis of a metric viewed through the health monitoring service 340, the customer can obtain the original log data from which the metric was generated. By having the log data stored in a database 334 retrievable through the log data service 332, the customer is able to subscribe to the service and always have access to its log data without having to generate customized code.

Figure 4:
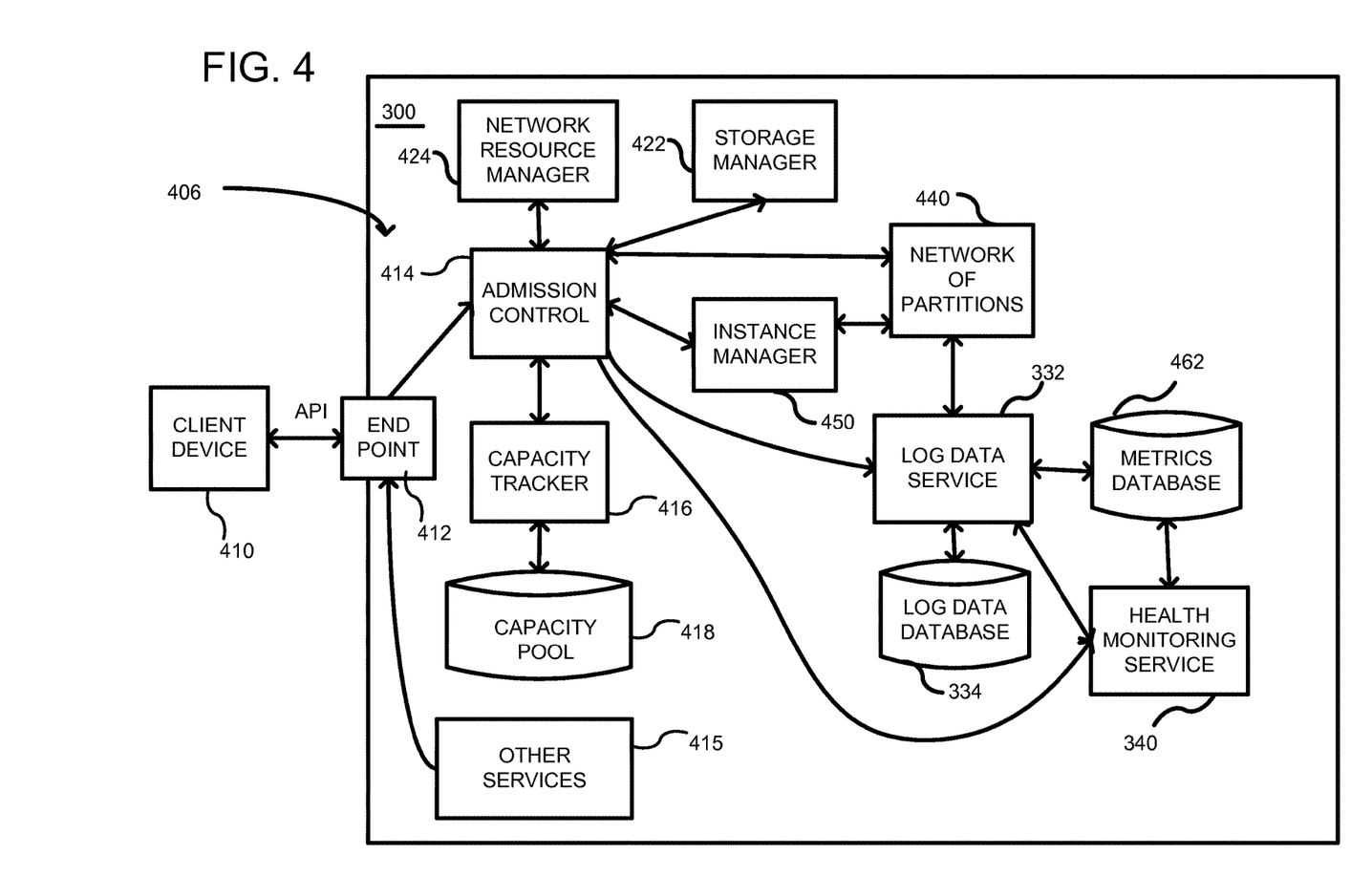
FIG. 4 shows further details of an example system including a plurality of management components associated with a control plane with the log data service for storing log data and metrics associated with the log data.

FIG. 4 illustrates in further detail management components 406 that can be used in the multi-tenant environment of the compute service provider 300. In order to access and utilize instances (such as instances 306 of FIG. 3), a client device can be used. The client device 410 can be any of a variety of computing devices, mobile or otherwise including a cell phone, smartphone, handheld computer, Personal Digital Assistant (PDA), desktop computer, etc. The client device 410 can communicate with the compute service provider 300 through an end point 412, which can be a DNS address designed to receive and process API requests. In particular, the end point 412 can be a web server configured to expose an API. Using the API requests, a client 410 can make requests to implement any of the functionality described herein. Other services 415, which can be internal to the compute service provider 300, can likewise make API requests to the end point 412.

Other general management services that may or may not be included in the compute service provider 300 include an admission control 414, e.g., one or more computers operating together as an admission control web service. The admission control 414 can authenticate, validate and unpack the API requests for service or storage of data within the compute service provider 300. The capacity tracker 416 is responsible for determining how the servers need to be configured in order to meet the need for the different instance types by managing and configuring physical inventory in terms of forecasting, provisioning and real-time configuration and allocation of capacity. The capacity tracker 416 maintains a pool of available inventory in a capacity pool database 418. The capacity tracker 416 can also monitor capacity levels so as to know whether resources are readily available or limited. An instance manager 450 controls launching and termination of instances in the network. When an instruction is received (such as through an API request) to launch an instance, the instance manager pulls resources from the capacity pool 418 and launches the instance on a decided upon host server computer. Similar to the instance manager are the storage manager 422 and the network resource manager 424. The storage manager 422 relates to initiation and termination of storage volumes, while the network resource manager 424 relates to initiation and termination of routers, switches, subnets, etc. A network of partitions 440 is described further in relation to FIG. 5 and includes a physical layer upon which the instances are launched.

Further details of the health monitoring service 340 are shown in FIG. 4. The health monitoring service 340 can provide monitoring for resources and the applications customers run on the compute service provider 300. System administrators can use the monitoring service 340 to collect and track metrics, and gain insight to how applications are running. For example, the monitoring service 340 can allow system-wide visibility into application performance and operational health. The health monitoring service 340 generally obtains metrics from a metrics database 462. The metrics database 462 can either be directly populated from the log data service 332 or indirectly populated via the health monitoring service 340. In either case, the metrics database 462 contains metrics that are associated with instances 306. The instances supply log data that is received by the log data service, which transforms into metrics and stored in the metrics database 462. The log data service further stores the log data in the log data database 334. The client device 410 can make API requests to view the metrics or log data. As indicated, the API requests from the client 410 can pass through the admission control 414 and onto either the log data service 332 and/or the health monitoring service 340.

Figure 5:
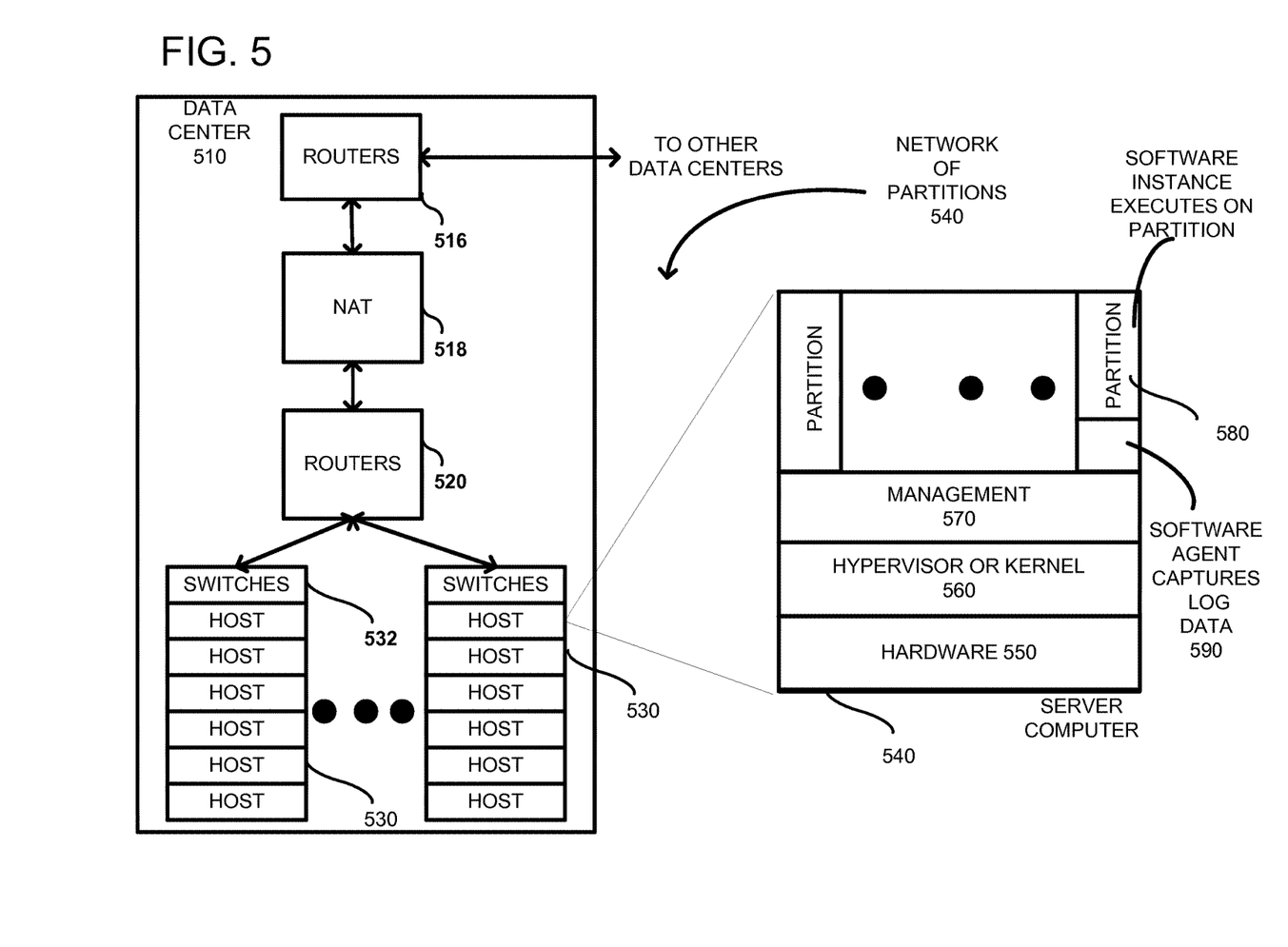
FIG. 5 shows an example of a plurality of host computers, routers and switches, which are hardware assets used for running virtual machine instances and a software agent used to generate the log data.

FIG. 5 illustrates the network of partitions 440 and the physical hardware associated therewith. The network of partitions 440 can include a plurality of data centers, such as data center 510, coupled together by routers 516. The routers 516 read address information in a received packet and determine the packet's destination. If the router decides that a different data center contains a host server computer, then the packet is forwarded to that data center. If the packet is addressed to a host in the data center 510, then it is passed to a network address translator (NAT) 518 that converts the packet's public IP address to a private IP address. The NAT also translates private addresses to public addresses that are bound outside of the datacenter 510. Additional routers 520 can be coupled to the NAT to route packets to one or more racks of host server computers 530. Each rack 530 can include a switch 532 coupled to multiple host server computers. A particular host server computer is shown in an expanded view at 540.

Each host 540 has underlying hardware 550 including one or more CPUs, memory, storage devices, etc. Running a layer above the hardware 550 is a hypervisor or kernel layer 560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The partitions 580 are logical units of isolation by the hypervisor. Each partition 580 can be allocated its own portion of the hardware layer's memory, CPU allocation, storage, etc. Additionally, each partition can execute its own virtual machine including a guest operating system. As such, each partition is an abstract portion of capacity designed to support its own virtual machine independent of the other partitions.

The virtual machine executing on a partition can include one or more applications and an operating system. Either the applications themselves or the operating system can include an agent 590, used to capture the log data. The log data can be passed by the agent through the management layer 570 to the log data service 332 (FIG. 4). The agent 590 can also generate the necessary parameters for transmission to the log data service, such as the stream name, the source identifier, the group name, etc. Some parameters of the virtual machines executing on the partitions can be monitored using the management layer 570, which can then pass the metrics to the health monitoring service 340 for storage in the metrics database 462 or to the log data service 332. Additionally, the management layer 570 can pass to the monitoring service 340 or to the log data service 332, the number of instances that are running, when they were launched, the operating system being used, the applications being run, etc. All such metrics can be used for consumption by the health monitoring service 340 and the log data service 332 and stored in database 462.

Figure 6:
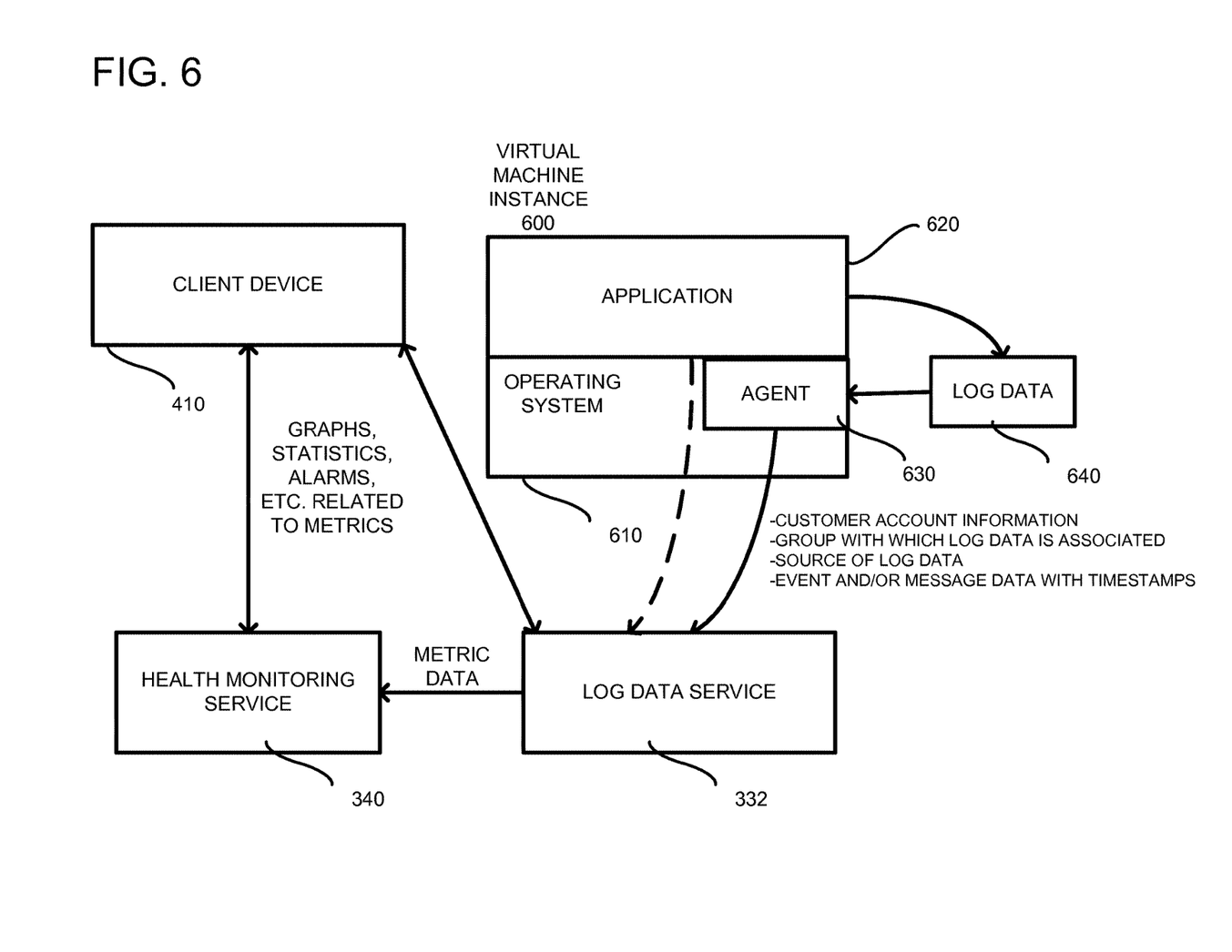
FIG. 6 is a detailed embodiment of a virtual machine instance including an embedded agent used to extract and send log data to a log data service.

FIG. 6 is a detailed embodiment of a virtual machine instance 600 including an operating system 610, an application 620 and an agent 630. The agent 630 can extract and send log data to the log data service 332. In this embodiment, the agent 630 is shown as a subcomponent of the operating system 610, but can be included in the application 620. The application 620 stores continuous log data in a storage area 640 (such as a syslog). The agent 630 can periodically extract the log data, convert it to the format of an API request and send it to the log data service 332. The API request can include customer account information, a group name associated with the log data, a source of the log data (e.g., an identification of instance 600) and the event and/or message data and the associated timestamps. In some embodiments, the agent 630 can be excluded and the application 620 can send the API request directly to the log data service 332, as indicated by the dashed line. Additionally, although not shown, a proxy server can be positioned between the application 620 and the log data service 332 in order to receive log data from one or more virtual machines and transmit the aggregated data to the log data service. The log data service 332 can then transform the API request to metric data and transmit the same to the health monitoring service 340. The client device 410 can access the health monitoring service 340 through one or more API calls to view the metrics or use the metrics to perform statistical analysis. The client device 410 can also access the log data service through API calls to access the log data.

Figure 7:
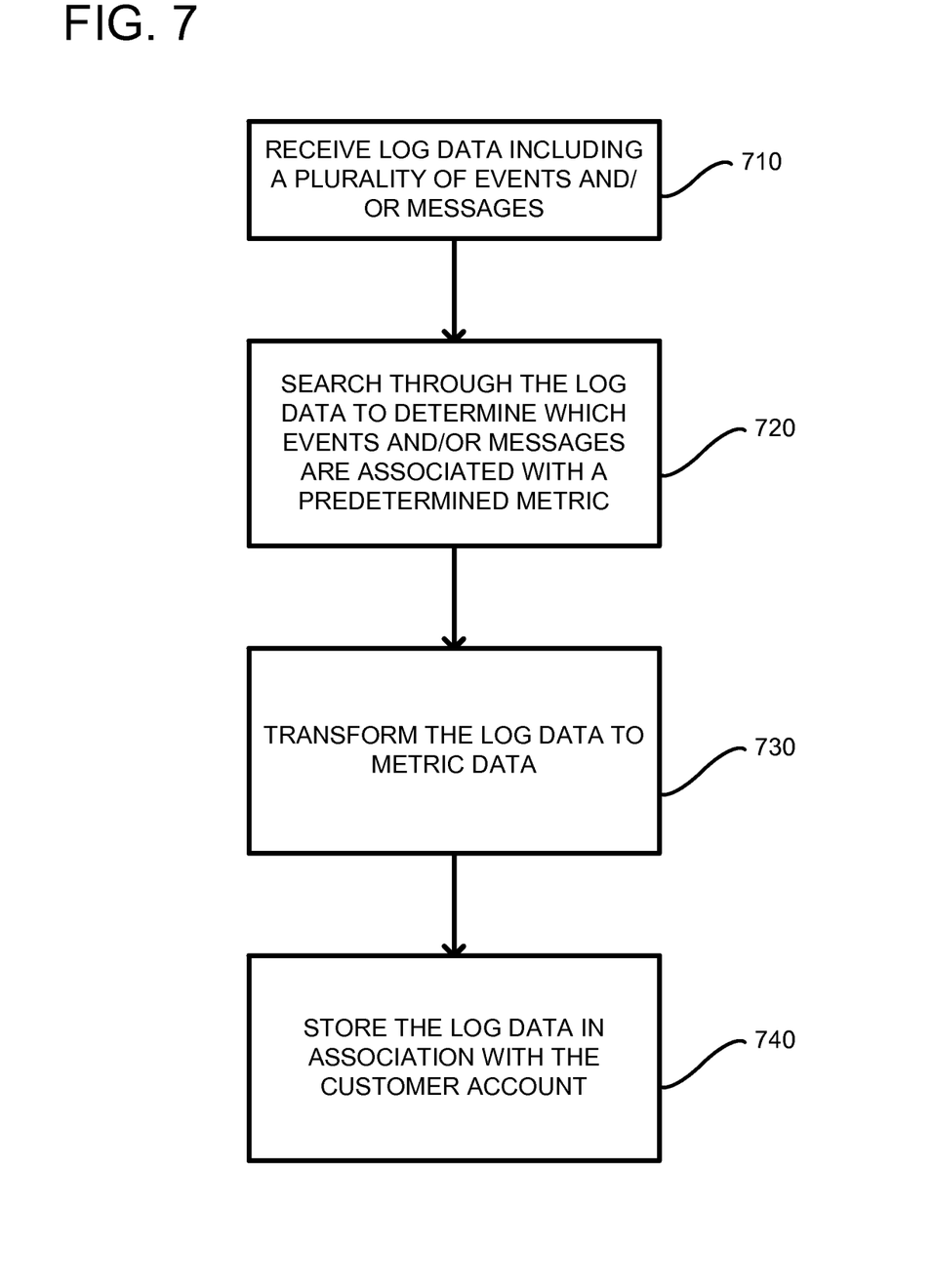
FIG. 7 is a flowchart of a method according to one embodiment for implementing a log data service.

FIG. 7 is a flowchart of a method according to one embodiment for implementing a log data service. In process block 710, log data can be received that includes a plurality of entries. Each log entry can include an event and/or a message. The structure and format of the entries depends on the particular system design and can vary dramatically. Typically, each entry is associated with a timestamp indicating when the event occurred. The log data is generally received by a log data service offered by the compute service provider. The receipt of the log data can include multiple streams with one or more group attributes. In process block 720, the log data service can search through the log data to determine which events and/or messages are associated with a predetermined metric. For example, the metrics can be associated with error messages or other desired information to be tracked. Searching can also be performed on other information, such as group names, timestamps, etc. In process block 730, the log data can be transformed to metric data using the results of the search. Thus, events or messages that were found in the log data can be converted to a count or other information indicating the matching of the event or message. In process block 740, the log data can be stored in association with a customer account. Storage of the log data can be in the form of a hierarchy such as a group name followed by stream names, followed by the event and/or message data. And the hierarchy of information can be associated with a customer account.

Figure 8:
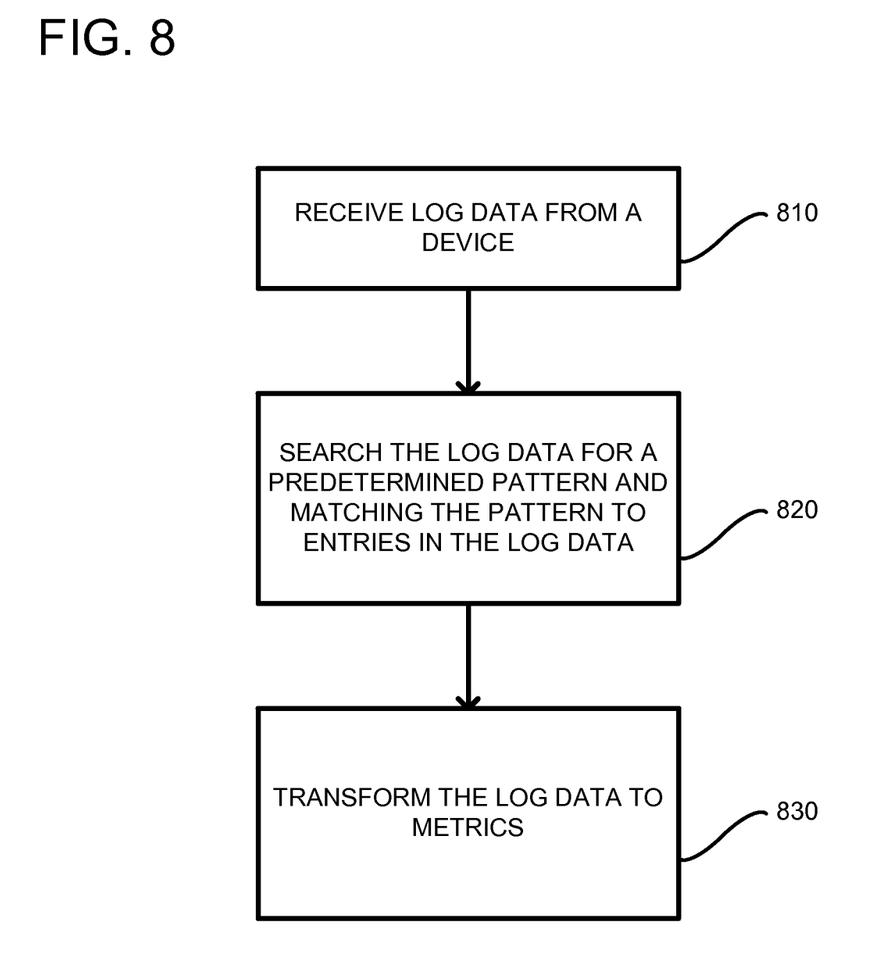
FIG. 8 is a flowchart of a method according to another embodiment for implementing a log data service

FIG. 8 is a flowchart of a method for implementing a log data service. In process block 810, log data is received from at least one device, such as a virtual machine, or other hardware or software resource within the compute service provider (e.g., routers, switches, etc.) or external to the compute service provider (e.g., mobile phones, computers, etc.). The log data service of the compute service provider generally receives the log data in the form of an API. The received log data can be streaming data or a log file. In process block 820, the log data service searches the log data for a predetermined pattern. The predetermined pattern can be a literal term, such as a series of letters (e.g., "nullreferenceException") or known words, such as "error". The predetermined pattern can also be tags used in the log stream. The pattern can be matched to entries in the log data. In process block 830, for matched entries, the log data can be transformed to metrics. In some embodiments, multiple metrics can be generated from a single matched entry. Transformation of the log data can include using a schema that defines how to perform the transformation, such as can be provided by a customer and stored in the customer account. Other methods of transformation can be used. Once transformed into a metric, a customer can monitor the metric to ensure it is within predetermined limits. For example, if an error count exceeds 100 or some other predetermined threshold, an alert can be automatically transmitted to the customer. The customer can then use API requests to access the metrics. The compute service provider can then generate for display the metrics, statistics associated with the metrics, graphs associated with the metrics, etc.

Figure 9:
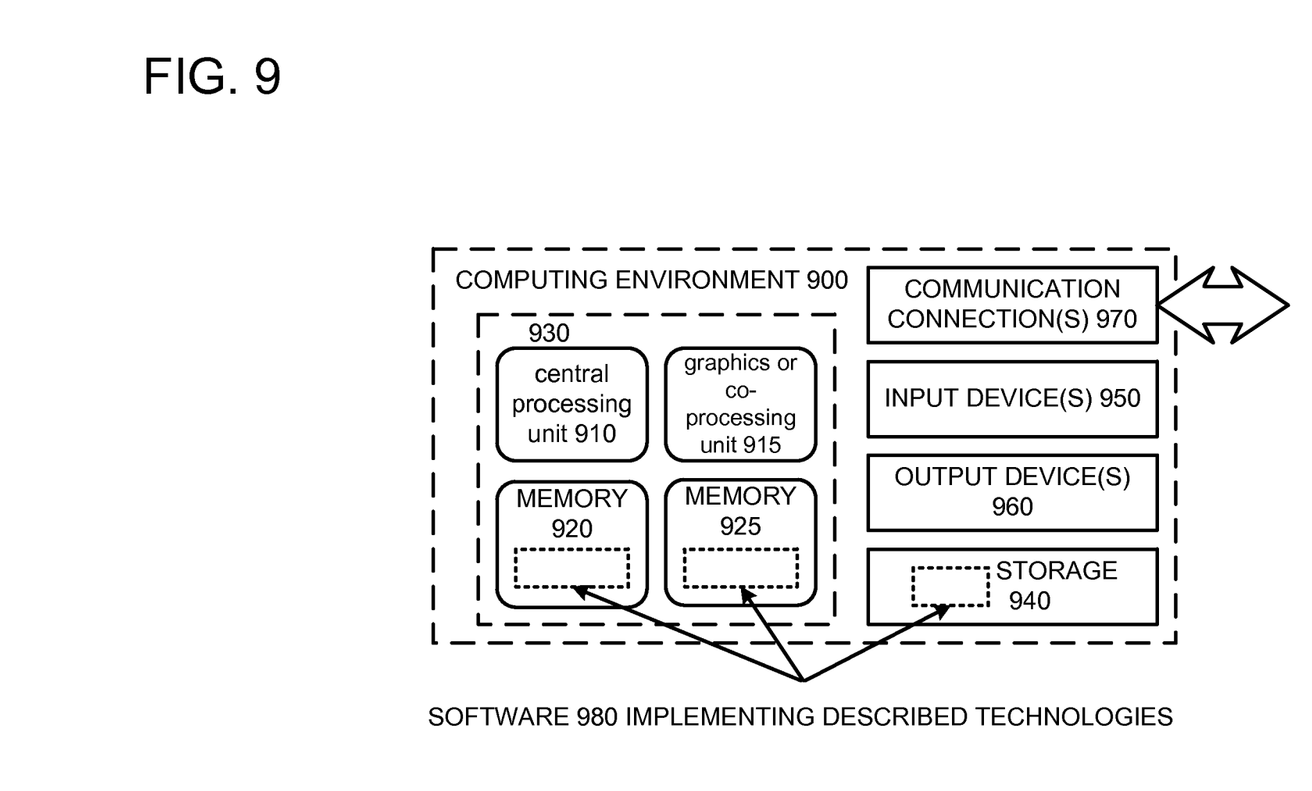
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of implementing a log data service in a multi-tenant environment operated by a compute service provider, comprising:
   receiving log data including a plurality of events and/or messages from a virtual machine in the multi-tenant environment, wherein the received log data is from the virtual machine executing an application and an operating system and the application transmits the log data directly to a log data service;
   using a service of the compute service provider, searching through the log data to determine which of the plurality of events and/or messages are associated with at least one predetermined pattern based on a policy document provided by a customer;
   transforming the log data based on a schema provided in the policy document that defines how to transform the log data into metric data in correspondence with the predetermined pattern using results of the search, the transforming including matching the predetermined pattern in the log data and using the matching to generate the metric data;
   transmitting the metric data to a service that allows the metric data to be monitored; and
   storing the log data in association with the customer account in the log data service.

2. The method of claim 1, wherein transforming the log data to metric data includes converting a matched pattern into a count associated with a number of occurrences for the matched pattern.

3. The method of claim 1, further including monitoring the metric data and transmitting a notification if the metric data exceeds a predetermined threshold.

4. The method of claim 1, wherein receiving the log data includes receiving multiple streams of log data from different sources and associating the multiple streams with a common group.

5. The method of claim 4, further including receiving an API request, having the customer account associated therewith, to access the stored log data, the API requesting including a name of the common group.

6. The method of claim 1, wherein the policy further indicates how the log data is to be transformed into metric data.

7. The method of claim 1, wherein the application and a logging agent coupled to the application each transmit log data to the log data service.

8. A computer-readable storage for implementing a log data service operated by a compute service provider, comprising:
   at a service of the compute service provider, receiving log data from a device, wherein the device includes a virtual machine instance running an application and an operating system, and wherein the application generates the log data and periodically transforms it into a format needed for an Application Program Interface (API) communication;
   using the compute service provider, searching the log data, received from the application, for a predetermined pattern and matching the predetermined pattern to one or more entries in the log data, the predetermined pattern being provided by a policy document associated with a customer of the compute service environment and stored in a customer account of the compute service provider;
   selectively transforming the log data based on a schema provided in the policy document to at least one metric using the predetermined patterns, wherein the transforming is accomplished based on the policy;
   transmitting the at least one metric to a service in the compute service provider that allows metrics to be monitored; and
   storing the log data within the compute service provider so that the log data is accessible to customers.

9. The computer-readable storage of claim 8, further including storing, by the service, the log data in association with the customer account.

10. The computer-readable storage of claim 8, wherein transforming the log data to at least one metric includes converting a matched pattern into a count associated with a number of occurrences for the matched pattern.

11. The computer-readable storage of claim 8, wherein the predetermined pattern is a literal term.

12. The computer-readable storage of claim 8, wherein the log data is streaming data or a log file.

13. The computer-readable storage of claim 8, further including monitoring the at least one metric to ensure that it is within predetermined limits.

14. The computer-readable storage of claim 8, wherein the log data is a log stream from the device which is external to the compute service provider, and further including associating the log stream with a log group that includes two or more log streams.

15. The computer-readable storage of claim 8, wherein receiving the log data includes receiving an API call that identifies a customer account, a group name associated with the log data, and events together with associated event timestamps.

16. The computer-readable storage of claim 15, further including storing the log data in association with the group name and receiving an API request to retrieve the stored log data, the API request including at least the group name together with a time range.

17. The computer-readable storage of claim 8, further including generating for display the following: the metrics, statistics associated with the metrics, and graphs associated with the metrics.

18. The computer-readable storage of claim 8, wherein the policy further indicates how the log data is to be transformed into metric data.

19. The computer-readable storage of claim 8, wherein the application transmits the log data directly to the log data service without using a logging agent.

20. A system for accessing log data in a multi-tenant environment, comprising:
   a plurality of host server computers coupled together through a network to form the multi-tenant environment, at least a portion of the host server computers for executing a plurality of virtual machines associated with a customer account including a policy document specified by a customer, the policy document including a schema defining how to transform log data into metric data, wherein at least one of the plurality of virtual machines includes an application executing using support of an operating system on a first virtual machine and the application periodically reformats the log data and transmits the log data as a data stream to a log data service executing within the operating system, wherein the log data service stores the log data in association with the customer;
   the log data service for receiving a plurality of log data streams from the virtual machines including the data stream from the first virtual machine and grouping the log data streams based on type, wherein the log data service selectively converts the log data streams into metrics based on the policy document using a schema stored in the customer account, wherein the policy document includes one or more patterns to match in the log data streams and defines how to perform the conversion and wherein the log data service is for transmitting the metrics so as to allow the metrics to be monitored by the customer; and
   a database coupled to the log data service for storing the log data streams in association with the grouping and in association with the customer account.

21. The system of claim 20, wherein either the application or a logging agent coupled to the application may transmit log data directly to the log data service.

* * * * *